US006464823B1

(12) United States Patent
Vantyle

(10) Patent No.: US 6,464,823 B1
(45) Date of Patent: Oct. 15, 2002

(54) PEELABLE RUB-ON TEMPORARY MASKING COATINGS

(76) Inventor: Peter Russell Vantyle, 17 E. Elizabeth St., Skaneateles, NY (US) 13152

( * ) Notice: Subject to any disclaimer, the term of this patent is extended or adjusted under 35 U.S.C. 154(b) by 52 days.

(21) Appl. No.: 09/651,745

(22) Filed: Aug. 30, 2000

(51) Int. Cl.[7] ............................ B32B 35/00; B05D 1/26

(52) U.S. Cl. ......................... 156/344; 427/11; 427/154; 427/284

(58) Field of Search ........................... 427/11, 154, 282, 427/284; 156/344

(56) References Cited

U.S. PATENT DOCUMENTS

| | | | | | |
|---|---|---|---|---|---|
| 4,652,163 | A | * | 3/1987 | Karliner et al. | 401/123 |
| 5,750,190 | A | * | 5/1998 | Woodhall et al. | 425/287 |
| 5,866,199 | A | * | 2/1999 | Swidler et al. | 427/154 |
| 6,022,582 | A | | 2/2000 | Vantyle | |

FOREIGN PATENT DOCUMENTS

| | | | |
|---|---|---|---|
| WO | WO 99/07483 | * | 2/1999 |

* cited by examiner

*Primary Examiner*—Mark A. Osele
(74) *Attorney, Agent, or Firm*—Bernhard P. Molldrem

(57) ABSTRACT

A paint mask in stick form is housed in a tubular dispenser. The paint mask permits immediate and convenient use by application to the surface of glass or other base to be protected from inadvertent paint, especially window frames and mullions, while prohibiting paint to affix itself to window glass. The painter may conveniently grip the paint mask stick dispenser and rub the tool end of the dispenser onto targeted areas of the surface to be protected. The mask forms a peelable skin onto which paint, varnish, or other coating material may have adhered or contacted. The use of razor blades or other hard or sharp instruments which might damage the underlying surface, is avoided.

7 Claims, No Drawings

PEELABLE RUB-ON TEMPORARY MASKING COATINGS

BACKGROUND OF THE INVENTION

This invention relates to a masking stick tool comprising a solid material mask in stick form and a tube or sleeve which houses the solid masking material and through which the solid masking material is advanced. The masking material temporarily masks a surface from paint, varnish or other coatings by applying a temporary masking coating upon rubbing an exposed portion of the solid paint masking material directly onto the surface to be masked, and thereafter removing the masking coating onto which paint varnish or other coating has adhered or made contact. The mask and coating forms a skin, and may be removed by peeling the skin from the protected surface. The paint mask material may be formed and applied as a crayon, or housed, advanced and hand-applied as one would the contents of a lip balm type dispenser.

The present invention meets the need in the art by providing a solid material that renders a convenient and accurately applied paint mask for windows and other surfaces requiring masking protection from paint, varnish or other coatings. The invention's ease, non-drip accuracy in application overcomes the disadvantages present in spraying, squeezing, rolling and brushing liquid paint and coating masks. Because the mask material and paint are simply peeled from the surface much like tape, yet without the difficulties that attend the application of tape to a surface. Nor does the use of this mask involve leave tacky residue associated with masking tape nor involve the hazards and damaging scratches associated with razor blades. A type of peelable mask is described in Jeri U.S. Pat. No. 2,365,705. A direct masking stick application as described in Van Tyle U.S. Pat. No. 6,022,582.

A mask dispensing process may be accomplished through the use of a variety of substances and still meet the masking needs of window painters. Methods had been developed to shield the glass from errant paint, including the use of plastic inserts, masking tape, liquid masks, and dabbing viscous substances such as petroleum jelly onto glass. Painters looked for three characteristics in their masking efforts: the mask had to be easy to apply, easy to remove, and provide an effective shield from adhering coatings. Existing masking techniques offer the required paint shielding but are difficult to use. For example, smearing petroleum jelly onto glass may offer an adequate shield from paint drips yet present an unacceptable application method due to the need for finger contact, inconsistent thickness, and likelihood the jelly would find its way onto the frame and mullions due to its paste-like consistency. Liquid masks drip and run. The current paint masking stick permits inadvertant paint to be removed by rinsing or wiping, but does not permit the self-shearing deposited film to be peeled off the protected surface.

OBJECTS AND SUMMARY OF THE INVENTION

A novel solid mask application process, dispenser and solid mask herein described offer clear advantages over traditional plastic inserts, masking tape, liquid masks, and dabbing viscous substances such as petroleum jelly onto glass. Advantages include 1.) even film thickness, 2.) uniform dispensing, 3.) regulation of amounts dispensed by adjusting hand/stick pressure, 4.) predictable film strip width, 5.) accurate non-drip spot mask and 6.) easy peel-off removal. Nor does the process require an intermediate applicator as with pens, brushes, sprays, or pastes, since a stick capitalizes on frictional dispensing and shears off predictable and uniform amounts of mask upon direct contact.

A preferred embodiment of this masking tool and process involves the painting of windows. Painting window frames is a tedious and time-consuming task as the painter desires to fully cover the window frame while avoiding getting the paint on the windowpane itself. Often windowpane glass is separated by narrow dividers known as mullions. The mullion is a slender member placed between adjacent panes of glass supported by a flange and held in place by putty, caulk or a narrow strip of wood that covers the outside edge of the glass adjacent the mullion. When window frames or mullions are painted, the paint which otherwise gets on the windowpane must be thoroughly removed.

Past efforts at keeping paint from getting onto the windowpanes had been accomplished by masking the glass with tape along the perimeter of the pane where glass meets frame or mullion so that the trim or frame material can be painted quickly and without regard to the juncture between glass and trim since any excess paint will be applied to the protective coating. However, applying tape is laborious and time consuming and removing the tape from the glass often presents problems, particularly where the tape hardens or becomes tacky. Where tape has not been employed, paint must be scraped off the glass typically with a razor blade. Another method of masking involves a triangular mask with an adhesive strip around the perimeter. The triangular mask is applied to the glass surface and overlapped to cover the entire surface with a portion of the mask. Portions that overlay the mullions would need to be cut off so as not to interfere with the painting of the frames. Another device provides a flexible narrow blade with a straight edge that contacts the mullion. The ends of the blade are cut at an oblique angle. Two adjacent blades join at a comer of the window. A rubber vacuum cup attaches to each of the blades for securing the blade to the glass. Another device has a spring clip that engages opposed mullions frictionally. The clip presses a cardboard paint shield firmly against the adjacent windowpane. Another device involves a fitting that permits the application of caulk along the perimeter of the pane which caulk may be peeled off subsequent to painting. Yet another window mask product consists of a razor blade mounted on a squeeze bottle containing a liquid paint mask composed of petroleum distillates, which mask is applied to the window's perimeter through a sponge applicator pad and left to dry. After the mullions and frame are painted the paint and mask drippings are scraped off with the attached razor-type blade.

Each of the foregoing paint mask efforts is plagued with drawbacks. The triangular shield designed to fit over the glass must be cut to size and the overlaps of triangular sections leave gaps that allow paint to seep onto the glass. The blade-style shield alluded to are labor intensive and require accurate positioning of adjacent shields to protect the glass surface. The cardboard shield becomes damp with paint and losses its effectiveness to seat the glass from painting. A spring clamp must be inserted to hold the cardboard sheet to the window. The caulk applicator requires the costly purchase of caulk, the manipulation of a relatively cumbersome caulk applicator, caulk build-up within the applicator, and time-consuming cleanup following caulk application. The razor blade/squeeze bottle method suffers the disadvantage of dripping, it requires time to dry onto the protected surface prior to painting, its petroleum distillate composition is an irritant to skin and eyes, and the use of a razor blade to remove paint scratches treated and energy efficient glass.

Commercial efforts at paint masking include the use of masking tape, caulk, masking paper and liquid paint masks. The liquid paint masks are applied by spraying, sponging, brushing or rolling. Hand-held portable paint mask applicators include a hand-held masking machine which applies masking paper to a desired location, and a fitted nozzle for a caulk gun that permits a caulk bead to be pumped onto and along a window pane's edge by means of a manual pump trigger. Accordingly, there is a need in the art for an improved mask for glass to prevent painting the glass while painting mullions.

The present invention represents such an improved mask and application and removal process. When masking windowpanes, the mask is dispensed as a film along the perimeter of a windowpane and thereafter peeled off along with any dripped paint. The paint mask comprises a solid stick, not unlike those found in crayons, lip balms and glue sticks. The stick may contain glycerin, glycol or other substances that mask and retard paint adhesion, and be of such rigidity that it shears off and leaves a film upon the glass by means of dragging the stick's end along the glass' surface. Following painting, the film disadheres and from the glass by peeling or sliding it from the protected surface. The solid paint mask may be: applied as a crayon, or housed and advanced thorough an applicator resembling a lip balm or glue stick dispenser and which may be manufactured from plastic or some similarly rigid material. The mouth of the applicator should have at least one corner whose angle measures a right angle or less so as to fit easily into angled window frames. The cap seals and protects the solid masking material housed within the container and doubles as a scraper which may be used to remove difficult paint drips. The container's cap assumes a wedge shape, forming an acute angle at its tip so as to permit access into the corners to lift and edge of the peeelable mask for easy removal. The method of the present invention will be useful to painting contractors, homeowners, hobbyists, autobody servicers, or anyone who paints materials that are adjacent to glass-like surfaces rapidly and inexpensively, or who otherwise wish to temporarily mask and protect solid material surfaces from brushed paints and coatings or overspray.

The inventions novelty lies in its coating and peelable removal process whereby a solid mask material, in the course of rubbing it onto glass, shears away and thereby deposits a protective paint masking coating onto the glass and is thereafter peeled from the protected surface like a skin. Mask components including hygroscopic glycols, silicone, oil, and fatty acids may be used to ease the removal of a polymer skin and thereby permit the skin to be slid or peeled from the surface to be protected. Easy-removal of a mask and its adhering paint distinguishes the superior paint mask.

Successful Mask Characteristics

A successful paint masking stick will exhibit the following favorable characteristics:

1. Easy dispensing onto the surface to be protected.
2. Effectively shields the protected surface from or other coating,
3. Easy removal of the mask along with paint drips or paint overspray.

The present invention achieves the listed characteristics in the following way. A dispenser or crayon houses a solid (or in the case of a solid dispenser a gelled) paint mask material that is dragged across a surface and deposits a film that shields the surface from paint, coatings or other outer affection. A dispenser housing may be used wherein the masking substance advances through a tubular opening and is exposed such that it may come into direct contact with the surface to be protected. The dispenser is then grasped in the hand and the exposed masking substance is rubbed onto the surface to be protected. The masking substance must have properties that allow it to shear away when rubbed onto the surface and deposit a thin uniform film that will act a protective shield against paint, coatings or other affection. Since paint is brushed and rolled onto a surface, it is important that the mask film be able to withstand the friction of the roller or brush. Nor should the mask film disadhere from the surface and stick to the roller or brush, hence the mask film must be minimally tacky. Hence, the mask's consistency be such that it 1.) will shear away and deposit a thin and uniform film 2.) adhere to the protective surface and resist movement, 4.) exhibit minimal tackiness and 5.) permit easy removal of the mask and adhering paint or coating.

DESCRIPTION OF THE PREFERRED EMBODIMENT(S)

Mask Ingredients

The type of self-shearing film-dispensing medium to be used will depend upon its shear-off characteristics, its miscibility with the intended masking ingredients, and its compatibility with the surface to be shielded. Essentially two parameters must be met within the present invention: 1.) the medium used to dispense the shield must have frictional shear-off characteristics such that a film is dispensed onto the protected surface when dragged upon it, and 2.) the type and amount of mask ingredient introduced into the shear-off medium must be appropriate for the amount, type and means of coating used, and must be compatible with the surface to be protected. The only limitation imposed on the amount of active mask ingredient added is that it not compromise the stick's shear-off and film-dispensing traits. For example, alkali salts that arise through the saponification of fatty acids (often referred to and used as soaps) are of the sort that may provide the shear-off and mask-miscible characteristics to carry out the invention's claimed process. Bars of waxy polyethylene or other polyglycolbars that exhibit a waxy shear-off consistency, as well as syndet bars (artificial soaps), may also be used as a shear-off film-dispensing medium.

Appropriate coating-dispensing mediums into which paint masking agents may be introduced are manufactured in a variety of ways. Waxy self-shearing glycols may provide an adequate dispensing stick. A variety of polyethylene glycols are manufactured in various molecular weights, the suitability of which as a paint masking stick medium is determined by the surface to be protected and the coating to be protected against. Conventional alkali salt soaps manufactured by traditional saponification of fatty acids maybe used. Modified soaps referred to in the industry as "syndets" may be used as well. Syndets differ from conventional soaps in that they are not formed totally from fat and alkali as conventional soaps are. Neutrogena™. Soap (Neutrogena Corp.) is an example of a transparent, nondetergent modified bar soap consisting of triethanolaniine, stearic acid, tallow, glycerin, coconut oil, castor oil, sodium hydroxide, oleic acid and cocamide DEA. Another is Basis™. Glycerin Soap (Beiersdort), which is a transparent modified bar soap consisting of tallow, coconut oil and glycerin. Syndets provide an appropriate film-dispensing medium that shears when rubbed onto glass. The fact that syndets mix well with glycerin and glycols makes them particularly suitable for paint masking purposes. Ullmann's Industrial Encyclopedia of Industrial Chemistry provides a following listing of ingredients generally used by the cosmetic industry manufacturing syndets:

| Component | Content % |
| --- | --- |
| Fatty alkyl sulfates | 30–60 |
| Builders/Plasticizers: | |
| Mono-, di-, and triglycerides<br>Paraffins, waxes, fatty alcohols | 30–50 |
| Fillers: | |
| starch, talcum, zinc oxide,<br>titanium oxide | 0–15 |
| Refatting/superfatting agents: | |
| Lecithins, lanolin, oils,<br>Alkanolamides | 1–7 |
| Active ingredients: | |
| D-panthenol Vitamin E,<br>amino acids,<br>Disinfectants | 1–3 |
| Water and moisturizers: | |
| Lactates, amino acids,<br>Sorbitol, glycerol | 1–5 |
| Coloring agents | 0–trace |
| Perfumes | 0–1 |

Polymeric Skin

The present invention is distinguished from previous paint masking stick processes in its ability to dispense a shear-off film depositing mask that ultimately forms a mask skin that may be removed from the protected surface by peeling off said skin. Such a skin may be formed by a number of processes.

Essentially, the mask's polymer skin-forming characteristics draw upon those exhibited in durable paints and other polymer-forming coatings. However, unlike paint applications, the mask's durable skin should lack paint's surface adhesion qualities and thereby permit easy removal of the mask layer. This may be accomplished by the addition of a lubricating substance such as a fatty acid, oil or glycol. The mask skin is to be composed of a polymer, often composed of very large molecules called macromolecules, and that are multiples of simpler chemical units called monomers. All polymers can be classified as either addition polymers or condensation polymers. An addition polymer is one in which the molecular formula of the repeating structural unit is identical to that of the monomer, e.g., polyethylene and polystyrene. A condensation polymer is one in which the repeating structural unit contains fewer atoms than that of the monomer or monomers because of the splitting off of water or some other substance. Many paints and coatings employ condensation polymerization when applying a polymer film to a surface. For example, paint, a mixture of a pigment and a binding medium, is usually thinned with a solvent to form a liquid vehicle and is generally applied in thin coats which dry by evaporation or by oxidation of the vehicle to form a film. The nature and amount of binder determine most of the paint film's performance properties—washability, toughness, adhesion, and color retention. Acrylic polymers are the binder of choice in producing quality latex paints. Latex paints are essentially emulsions of a polymer in water. Paint without pigment is usually called varnish. Varnish is defined as a liquid which is converted to a transparent or translucent film after application as a thin layer. In general, it is a homogenous mixture of film-former, drier and solvent which dries by a combination of evaporation, oxidation and polymerization to give a transparent or translucent film.

The mask polymer skin may be formed by exposing the mask film to air. It may or may not undergo chemical reaction depending upon the existence of linear polymers or simple chemicals that carry out a cross-linking chemical reaction after the mask film has been dispensed and exposed to elements commonly found in the air. Where polymerization occurs due to a chemical reaction between paint and air, the polymer process draws upon air's oxygen and water vapor in particular to act as reactive chemical ingredients. As the solvents evaporate, cross-linking begins and low molecular weight, linear or branched polymers in the mask film are converted to a hard, tough, cross-linked film.

Methylcellulose may be used to achieve an effective mask skin. Cellulose, a polysaccharide polymer that is composed of sugar molecules may be used to create a mask skin. Wood cellulose derived from lignin chemically and then regenerated back to its original composition results in as plastic cellophane material. Cellulose is a naturally occurring polymer made up of repeating glucose units. Although it is a linear polymer, cellulose is thermosetting; that is, it forms permanent, bonded structures that cannot be loosened by heat or solvents without causing chemical decomposition. Its thermosetting behavior arises from strong dipolar attractions that exist between cellulose molecules, imparting properties similar to those of interlinked network polymers.

Polyethethylene and polypropylene may be used to create the mask film's skin. The ethylene and propylene form polymers (polyethylene and polypropylene) by joining monomers one after another to the growing chain composed of repeating ethylene and propylene monomers. Polyurethane and silicone polymers (as well as butadiene, styrene, vinyl acetate, and acrylic monomers which form the durable-skin characteristics in latex paints) may be used to dispense a suitable mask skin onto a protected surface by incorporating such polymers into the composition of the frictionally dispensing stick material. Polyurethane polymers are synthetic organic polymers formed of linear repetitions of the urethane group for the production of coating bases. Silicone polymers are mixed organic-inorganic compounds in their backbone and consist of alternating silicon and oxygen atoms with organic groups attached to each of the silicon atoms. Polyurethanes form some of the highest-performance coatings available. A variety of formulations is marketed. One type is a one-component (one-pot) prepolymer containing excess isocyanate groups. Upon application of the liquid to a surface, these groups react with water from the atmosphere to form a urea, which further reacts with other isocyanate groups to provide the cross-linking necessary to cure the coating.

Higher-molecular-weight silicone polymers exhibit elastic qualities and remain soft and rubbery at very low temperatures. The polymers present in synthetic latexes include a binder dispersed in the water and form films by fusion of the plastic particles as the water evaporates. The size of the molecules, together with their physical state and the structures that they adopt, are the principal causes of the unique properties associated with the polymer mask skin.

Methylcellulose Polymer

Methylcellulose and hydroxypropyl methylcellulose are polymers that, when introduced onto a solid self-shearing stick, permit the stick to dispense paint mask film that forms a slippery paint barrier when hydrated, (a barrier from which adhering paint may be easily wiped off). Methylcellulose and hydroxypropyl methylcellulose are water soluble polymers used for water retention, viscosity modification, binding and other functionalities in a wide variety of industrial products as, gums, coatings, excipients, as well as in processed foods and pharmaceuticals. Nitrocellulose was employed in the production of cellophane and has been employed in paints, as well as the less flammable and more versatile cellulose acetate, Bakelite, and vinyl polymers. These and similar polymers, when introduced into a self-shearing film-dispensing stick, render a non-adhering coating mask which is easily peeled from the protected underlying surface.

Mask's Peelable Skin

Infusing a paint masking stick with a peelable skin may be accomplished in a number of ways. Incorporating the characteristic of a peelable skin into a hand-held paint masking stick film is what distinguishes the present invention. The precise proportions comprising the polymer stick dispensing medium will vary to accommodate the particular polymer used, the strength and characteristics of the skin desired, and the coating to be masked against. Additionally, the materials making up the dispensing stick material will vary to accommodate the particular polymer to be dispensed. The polymeric backbone of cellulose, a natural carbohydrate that contains a basic repeating structure of anhydroglucose units. Hydroxypropyl methylcellulose is created using propylene oxide in addition to methyl chloride to obtain hydroxypropyl substitution on the anhydroglucose units, and this substituent group contains a secondary hydroxyl on the number two carbon and may also be considered to form a propylene glycol ether of cellulose. Both methylcellulose and hydroxypropyl methylcellulose possess properties of organic solubility and affect the thermal gelation temperature of aqueous solutions. The ethers are used as excellent protective colloids, thickeners, improve emulsion stability, suspend solids, lubricate and retain moisture. Their "masking" use to date has been restricted to mask the taste by forming a masking film on water sensitive drugs. The ethers are used in wallpaper pastes because they provide excellent slip properties so patterns can easily be matched. The ethers are used to control viscosity and improve wet tack. The unique combination of organic and water solubility offered by these ethers makes them ideal thickeners for scrape-off and flush-off paint removers. They provide the thickening and cling needed to retain the paint remover on vertical or inclined surfaces, yet permit the softened paint to be rinsed off easily with water. In addition the ethers are used as thickeners for gelled alcohol used in charcoal lighters and canned-fuel products. The ethers in the present invention may be used to thicken masking glycols, including glycerin, and thereby adapt them for solid stick use. Hydroxypropyl methylcellulose has been approved for direct food use by the FDA under 24 CFR 172.874, and has been approved by the USDA as an emulsifying agent, binder, thickener, and stabilizer and is listed in the Standards and Labeling Policy Book published by the USDA.

For purposes of citing a formula that includes methylcellulose or hydroxypropyl-methylcellulose: begin mixing the solid mask material by thickening glycerin that has been thickened by dissolving methylcellulose or hydroxypropyl methylcelluose into it until the glycerin is saturated. To every one part thickened glycerin, stir in one and one half parts(by volume) of the aforementioned syndet heated to a liquid. To this, one mixes into the composition one quarter part of methylcellulose or hydroxypropyl methylcellulose for added masking quality triggered when the ether is either hydrated or comes into contact with a gel-triggering solvent within the paint/coating. Let liquid cool to a solid while stirring intermittently.

The following is a detailed formulation that has rendered effective results:

Creating the Glycerin/Methyl Cellulose Mixture

1. Combine 10 grams glycerin, 32 grams water, 7 grams propylene glycol, 2 grams surface treated methyl cellulose (Dow J75N), 4.5 grams syndet.
2. Mix ingredients and heat to 90 degrees celsius.
3. Remove from heat.
4. While mixing, slowly add 3 grams of sodium bicarbonate and stir. Some foaming may occur. (The sodium bicarbonate is used to raise the PH of the solution to 8.5 and thereby activate the surface treated methyl cellulose. A litmus check should be done at this point to assure that proper PH has been achieved.)
5. Pour into dispensing containers and let cool.

Ethyl cellulose is a non-water soluble that may be introduced into a solid mask material to create the peelable skin that is resistant to water soluble coatings. Ethyl cellulose is an ethyl ether of cellulose in the form of white granules obtained from the treatment of wood pulp with alkali, used in plastics and lacquers.

Methylcellulose, hydroxypropyl methylcellulose and ethyl cellulose, when introduced into the stick medium and accordingly dispensed within the film, increases the mask's effectiveness in a number of ways. The ethyl cellulose, methylcellulose or hydroxypropyl methylcellulose, when dissolved within a masking ingredient (such as glycerin), renders a paint shielding mask and skin that is effective against oil-based, latex paints, and other surface coatings. Methylcellulose, hydroxypropyl methylcellulose and ethyl cellulose introduced into the masking stick and thereafter dispensed as a mask film, each produces a resulting mask film skin that peels from the surface to be protected.

A variety of polymer-dispensing solid mask materials may be created simply by eliminating undesired paint pigments and solvents from commercially available paints, varnishes, polyurethanes, and other polymer-based coatings. The "stripped" coating is thereafter introduced into an appropriate self-shearing film-dispensing substance where the stripped coating's binder may create the desired polymer masking film when dispensed. Such proportions and materials are easily available to those in the trade and their proportions could be easily determined.

Essentially, any substance that: 1.) forms into a self-shearing stick, and 2.) whose mask contents render a peelable paint shielding skin when frictionally dispensed as a film, constitutes an effective stick mask that dispenses an effective masking shield that is easily removed.

The Masking Process and Properties

The mixture's methyl cellulose, when adequately hydrated and combined with other ingredients, renders a self-shearing material capable of depositing an effective paint shield when rubbed or dragged onto a surface to be protected. Propylene glycol acts as a plasticizer making the masking material's skin non-tacky to paint brushes and rollers. The masking film's skin is cohesive and resists movement when brushed or rolled. After the mask film is dispensed onto the surface, inadvertent paint drips and overspray adhere to the skin of the deposited masking film. As paint on the mask film begins to dry, the water in the film evaporates from the gel leaving in its place a peelable polymer skin. The dried paint resides on this skin. Though water or solvents evaporate from the masking strip, remaining unevaporated oils or glycerin provide a lubricating layer between the protected surface and the paint mask skin upon which dried paint adheres. This lubricating layer allows the film along with any adhering paint drips, coating overspray or other affections to be easily slid or peeled from the protected surface. To the extent alcohol or solvents are substituted for water in the formulation, evaporation and skin formation is accelerated.

Dispenser

It is anticipated that the paint mask solid will be housed in, and advanced through, a hand-held tubular container, to wit; a block-shaped lip balm-type dispenser with a moisture-locking cap and movable base. The base advances the paint mask solid through the dispenser painting window mullions and frames. Changes may be made to modify the constituents of the masking solid and various additives may be incorporated into the paint mask composition to impart desirable attributes without altering the essential advantages offered by employing a paint mask in dispensable solid form and its unique method of direct mask application.

The present invention has proven effective in protecting various materials other than glass, where the protected surface offers frictional resistance to the solid coating material dragged upon its surface sufficient to shear off a layer of the coating material. Such materials include metal, wood, painted surfaces, plastic, fiberglass and any other surface conducive to the shear-off and dispensing characteristics exhibited by stick dispensers.

The masking stick container's cap assumes a wedge shape, forming an acute angle at its tip so as to lift the mask's skin and thereby ease the peeling away of the mask and coating drips. The method of the present invention will be useful to painting contractors, homeowners, hobbyists, or anyone who paints and desires to protect surfaces from inadvertent paint.

Uses

The process, formulation and dispenser herein described are not restricted to painting windows. For example, the stick paint mask would be a valuable assist in the hands of a car and boat body repair servicer who presently uses more cumbersome methods to mask areas from paint touch up or over-spray. Those areas of the vehicle where spray paint is not desired or that are not to be touched-up with paint are simply masked by rubbing the mask stick material onto that area of the vehicle's surface. Thereafter the body may be brushed, touched up or sprayed and any undesired paint simply peeled away.

While the invention is described with reference to preferred embodiment(s), the invention is not strictly limited to those embodiments. Rather, may modifications and variations would be apparent to persons skilled in the art without departing from the principles of this invention, as defined in the following Claims.

I claim:

1. A process of temporarily masking a glass or equivalent surface to be protected from paint, varnish, or other coating material and later removing the masking; comprising the steps of applying a film of a substantially solid mask material onto said surface to be protected, said mask being in stick form and including a material component displaying a property of producing a skin capable of being peeled from the protected surface and producing said skin on said surface when said mask is dragged across it; and a component forming a lubricant layer behind said skin that prevents said skin from adhering to the protected surface; said mask being applied by dragging said mask in stick form across said surface to be protected; applying said coating material; and thereafter peeling away said mask skin together with any adhered coating material from said protected surface.

2. The process according to claim 1, wherein said mask material includes an organic water-insoluble polymer in sufficient concentration so that the mask can be applied by dragging it across the protected surface, and which forms a skin that peels of from the protected surface, together with any adhered coating material.

3. A process of temporarily masking a glass or equivalent surface to be protected from paint, varnish, or other coating material and later removing the masking; comprising the steps of applying a film of a substantially solid mask material onto said surface to be protected, said mask material being in stick form; said mask material forming a polymer film skin on the protected surface and displaying a property of producing said skin as a substantially uniform film on said surface after said mask material has been dragged across it, and said skin having the property of forming a lubricant layer behind the polymer film skin so that the skin does not adhere to the surface to be protected; said mask material being applied by dragging a stick of said mask material across said surface to be protected; permitting said skin to form; applying said coating material; and thereafter wiping, rinsing or peeling away said mask material together with any adhered coating material from said protected surface.

4. A process of temporarily masking a glass or equivalent surface to be protected from paint, varnish, or other coating material and later removing the masking; comprising the steps of applying a film of a substantially solid mask material onto said surface to be protected, said mask material being in stick form, and including a component forming a condensation polymer film skin on the protected surface and displaying a property of producing said skin as a substantially uniform film on said surface when said mask material has been dragged across it, and a component forming a lubricant layer behind said skin such that said skin displays a low adhesion on the protected surface such that it can be removed by peeling; said mask material being applied by dragging a stick of said mask material across said surface to be protected; permitting said skin to form; applying said coating material; and thereafter removing said mask material together with any adhered coating material from said protected surface.

5. A process of temporarily masking a glass or equivalent surface to be protected from paint, varnish, or other coating material and later removing the masking; comprising the steps of applying a film of a substantially solid mask material onto said surface to be protected, said mask material being in stick form and forming a substantially polymer film skin that does not adhere to the glass or equivalent surface and is capable of being peeled from the protected surface and displaying a property of producing said skin as a substantially uniform film on said surface when said mask material is dragged across it and forming a lubricant layer behind said skin that permits the skin to be later peeled away; said mask material being applied by dragging a stick of said mask material across said surface to be protected; permitting said skin to form; applying said coating material; and thereafter peeling away said mask material together with any adhered coating material from said protected surface.

6. A process of temporarily masking a glass or equivalent surface to be protected from paint, varnish, or other coating material and later removing the masking; comprising the steps of applying a film of a substantially solid mask material onto said surface to be protected, said mask material forming a substantially condensation polymer film skin having a low adhesion for said glass or equivalent surface and being capable of being peeled from the protected surface and displaying a property of producing said skin as a substantially uniform film on said surface when said mask material is dragged across it and forming a lubricant layer behind said skin; said mask material being applied by dragging a stick of said mask material across said surface to be protected; permitting said skin to form; applying said coating material; and thereafter peeling away said mask material together with any adhered coating material from said protected surface.

7. A process according to claim 1, 2, 3, 4, or 5 wherein said stick has an angular profile with one corner whose angle is 90 degrees or less, so that it may provide mask coverage into corners.

* * * * *